United States Patent [19]

Watanabe et al.

[11] Patent Number: 4,740,847

[45] Date of Patent: Apr. 26, 1988

[54] MAGNETIC RECORDING/REPRODUCING APPARATUS

[75] Inventors: Katsuyuki Watanabe, Katsuta; Shinji Ozaki, Funabashi; Yoshizumi Watatani, Fujisawa, all of Japan

[73] Assignee: Hitachi, Ltd., Tokyo, Japan

[21] Appl. No.: 854,023

[22] Filed: Apr. 21, 1986

[30] Foreign Application Priority Data

Apr. 19, 1985 [JP] Japan .................................. 60-82433

[51] Int. Cl.$^4$ ..................... G11B 5/03; G11B 15/14
[52] U.S. Cl. ......................................... 360/66; 360/64
[58] Field of Search ..................... 360/66, 61, 62, 64

[56] References Cited

U.S. PATENT DOCUMENTS

| | | | |
|---|---|---|---|
| 2,468,782 | 5/1949 | Ross et al. | 360/66 |
| 3,342,949 | 9/1967 | Wessels | 360/66 |
| 4,390,915 | 6/1983 | Matsuyama et al. | 360/66 |

FOREIGN PATENT DOCUMENTS 0113986 7/1984 European Pat. Off. .
2027252 2/1980 United Kingdom .
2068628 8/1981 United Kingdom .

Primary Examiner—Vincent P. Canney
Attorney, Agent, or Firm—Antonelli, Terry & Wands

[57] ABSTRACT

A magnetic recording/reproducing apparatus in which at least two recording and reproducing magnetic heads are mounted on a rotatable cylinder with an angular distnce of 180° therebetween, wherein audio signals having undergone a pulse code modulation are recorded on record tracks slanted relative to the longitudinal direction of a magnetic tape wrapped around the rotatable cylinder. The record track is divided trackwise into a plurality of channels. The audio signals are recorded on the channel basis. The magnetic tape is transported in a forward or backward direction while recording or reproduction is conducted. The rotatable cylinder has mounted thereon a first erasing head rendered operative when the magnetic tape is transported in the forward direction and a second erasing head operative when the magnetic tape is transported in the backward direction for erasing only the audio signal of a given channel on the record track.

4 Claims, 5 Drawing Sheets

MAGNETIC RECORDING/REPRODUCING APPARATUS

BACKGROUND OF THE INVENTION

The present invention generally relates to a helical scan type magnetic recording/reproducing apparatus for domestic use. More particulary, the invention concerns a magnetic recording/reproducing apparatus in which each of slant tracks formed on a magnetic tape is divided into a plurality of sub-tracks or areas in the longitudinal direction of the track, wherein audio signals having undergone a pulse code modulation (hereinafter referred to as PCM audio signal) are each recorded or reproduced on or from the sub-tracks (areas or channels) resulting from the division.

In general, the helical scan type magnetic video recording/reproducing apparatus (such as a VTR) for domestic use has a rotatable cylinder on which magnetic heads are mounted with an angular displacement of approximately 180° C. therebetween. A magnetic tape is wound or wrapped at a slant around the periphery of the cylinder over an angular range of approximately 180°, whereby a video signal is recorded on the record track formed at a slant relative to the direction in which the magnetic tape is transported.

Recently, it has been proposed that the record track is divided in a plurality of sub-tracks or areas in the direction trackwise and that a PCM audio signal is recorded or reproduced on or from each of the areas resulting from the track division instead of the video signal.

More specifically, according to the proposed audio signal recording method, a single video track is divided into six sub-tracks or areas in the longitudinal direction of the track to thereby prepare first to sixth channels. For recording the signal on the first channel, a PCM audio signal is recorded only on the first channel while no recording is made on the second to sixth channels. This recording operation is performed sequentially on the adjacent tracks from one to another. Of course, for the recording of the second channel, only the sub-track or area corresponding to the second channel is subjected to the recording sequentially on the track basis (i.e. from track to track).

In this conjunction, it is noted that the magnetic video recording/reproducing apparatus includes an erasing head which has a width large enough to erase the record widthwise over the whole width of the magnetic tape. Consequently, when the video track is divided into six sub-tracks or areas for recording different PCM audio signals on the six corresponding channels, respectively, it is impossible to selectively erase only the desired channel for the purpose of recording again a new PCM audio signal thereon.

SUMMARY OF THE INVENTION

It is therefore an object of the present invention to provide a magnetic recording/reproducing apparatus in which PCM signals recorded on a magnetic tape can be erased selectively on the channel-by-channel basis, wherein another PCM audio signal can be recorded on the erased channel in either forward or backward transporting direction of the magnetic tape.

In view of the above object, there is provided according to an aspect of the invention a magnetic recording-/reproducing apparatus which includes a first flying erasing head put into operation in the forward tape transporting direction, and a second flying erasing head put into operation in the backward tape transporting direction, both of the flying erasing heads being mounted on a rotatable cylinder at respective positions selectively determined so as to ensure satisfactory erasing characteristic or performance, so that a PCM audio signal can be recorded on each of areas or sub-tracks resulting from the division of each track into six, regardless of whether the magnetic tape is transported in the forward direction or backward direction.

DESCRIPTION OF THE PREFERRED EMBODIMENTS

Now, the invention will be described in detail in conjunction with an exemplary embodiment thereof by referring to the accompanying drawings.

Figure 1:
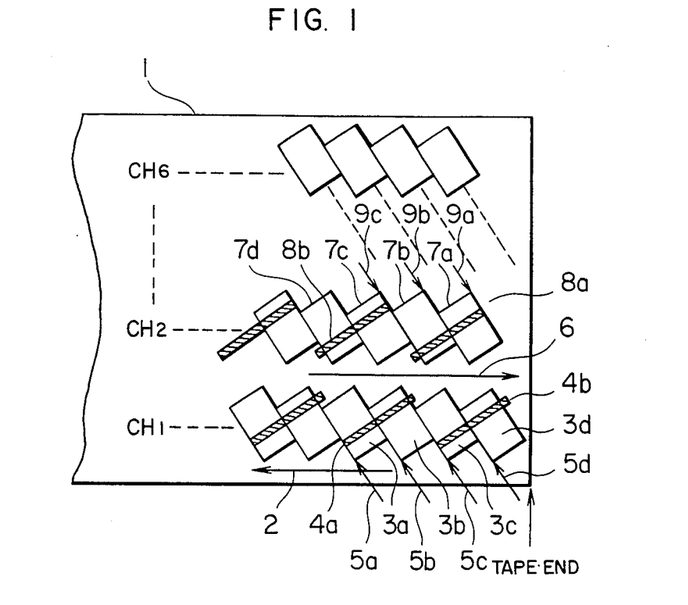
FIG. 1 is a view for illustrating a record format according to an exemplary embodiment of the invention.

FIG. 1 shows a record pattern on a magnetic surface of a magnetic tape 1. As will be seen in the figure, each of the tracks is divided into areas of a first channel CH 1, a second channel CH 2, ..., and a sixth channel CH 6, respectively, sequentially from the bottom, as viewed in the figure, wherein PCM audio signals are recorded on the areas of the respective channels. This recording system will be referred to as the multi-channel PCM system. In this system, it is possible to have the first channel CH 1 recorded in the forward tape transporting direction as indicated by an arrow 2 while the second channel CH 2 is recorded in the backward tape transporting direction as indicated by an arrow 6, by way of example, with a view to recording and/or reproducing the individual channels independent of one another. On the other hand, for erasing the record, it is required that records on the individual channels can be erased independently and separately from one another. To this end, there are employed flying erasing heads according to the teaching of the invention.

Figure 2:
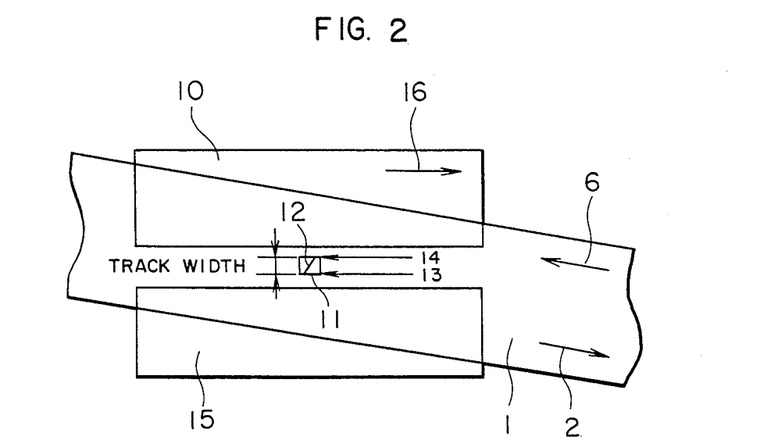
FIG. 2 is a view for illustrating operational relationship between a head cylinder and a magnetic tape.

In the first place, description will be made of the erasure and the recording in the case where the magnetic tape is transported in the forward direction. The flying erasing head is so designed to have a tracking width Tw' which is at least twice larger than the track pitch $P_T$ (i.e. $Tw' \leq 2P_T$) so that two tracks can be simultaneously erased. As indicated by a reference symbol 4a in FIG. 1, in order to allow the video head to record PCM signal on the tracks 3a and 3b, the erasing head has to previously erase the areas corresponding to the tracks 3a and 3b. For the two succeeding tracks 3c and 3d, the erasure and the recording are conducted in the similar manner. FIG. 2 shows a positional relationship between a cylinder and a video head mounted thereon. More specifically, a numeral 10 denotes an upper cylinder, 15 denotes a lower cylinder, 16 denotes an arrow indicating a rotational direction of the cylinder, 11 denotes a video head, 13 denotes a bottom face of the video head 11, a numeral 14 denotes a top face of the video head, and a numeral 12 denotes a head gap. As is well known, when the magnetic tape 1 is transported in the forward direction indicated by the arrow 2, positions indicated by arrows 5a, 5b, 5c and 5d are determined by the bottom face of the video head 11, as is illustrated in FIG. 1 for the first channel CH 1. On the other hand, when the magnetic tape 1 is being transported in the backward direction indicated by the arrow 6, positions of arrows 9a, 9b and 9c are determined by the top face 14 of the video head 11, as is illustrated for the second channel CH 2 in FIG. 1. Accordingly, in order to inhibit the flying erasing head from erasing the newly recorded track, it is necessary to mount the flying erasing head on the cylinder at such position in which the bottom face of the flying erasing head is aligned with the position of the arrow 5a or 5c, respectively, as indicated by symbols 4a and 4b, for the first channel CH 1, i.e. when the tape is transported in the forward direction. Similarly, for the second channel, i.e. in case the tape is transported in the backward direction, it is required that the top face of the flying erasing head is aligned with the position of the arrow 9a or 9c, respectively, as indicated by symbols 8a and 8b.

In this connection, it will be noted that when the tracking width Tw' of the flying erasing head is so selected that $Tw' \leq 2P_T$ (wherein $P_T$ represents the track pitch), it is impossible to align the position of the flying erasing head in the manner described above in both of the forward and backward tape transporting directions. Thus, it is required to provide a pair of flying erasing heads one of which is put into operation only in the forward tape transporting direction with the other being employed only in the backward tape transporting direction.

Figure 3A:
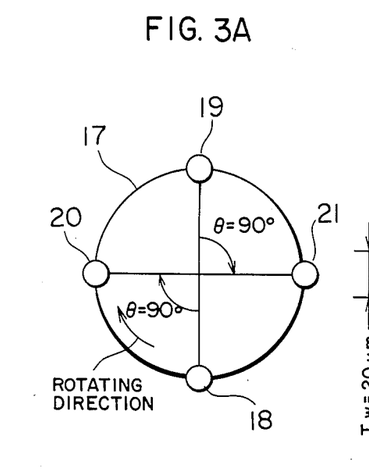
FIGS. 3A, 3B; 4A, 4B; 5A, 5B and 6A, 6B are views for illustrating head arrangements on the cylinder and vertical positional relationships among magnetic heads, respectively.
Figure 3B:
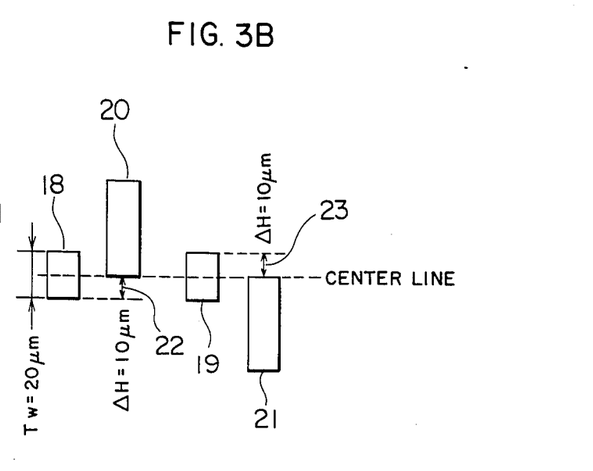

FIGS. 3A and 3B are views for illustrating a head mounting arrangement in a two-head type video tape recorder or VTR. More specifically, FIG. 3A shows disposition of the heads on the cylinder, and FIG. 3B illustrates inter-head offsets. In the figures, a reference numeral 17 denotes a cylinder, 18 and 19 denote video heads, respectively, 20 denotes a flying erasing head which is put into operation only for the forward tape transporting operation mode, and 21 denotes a flying erasing head put into operation only for the backward tape transporting operation mode. In the arrangement shown in FIGS. 3A and 3B, it is assumed that the track pitch $P_T$ is 20 μm, the tracking width Tw of the video heads 18 and 19 is 20 μm, and that the flying erasing heads 20 and 21 are mounted with a displacement angle $\theta = 90°$ relative to the video heads 18 and 19, respectively. Accordingly, in consideration of the fact that $P_T = 20$ μm and $\theta = 90°$, an offset ΔH indicated by a double-head arrow 22 is provided so that the bottom face of the flying erasing head 20 for the forward operation mode only is higher than the bottom faces of the video head 18 and 19 by 10 μm while the top face of the flying erasing head 21 for the backward operation mode only is lower than the top faces of the video heads 18 and 19 by 10 μm, as indicated in FIG. 3B. In general, the offset ΔH can be expressed in terms of the track pitch $P_T$ and the angle $\theta$ as follows:

$$\Delta H = \frac{\theta \cdot P_T}{180} \quad (1)$$

In the following description, the track pitch in the operation mode in which the magnetic tape is transported at a standard speed v (hereinafter referred to as the standard recording mode or simply as SP mode) is represented by $P_{T1}$ while the track pitch in the operation mode in which the magnetic tape is transported at a speed v/n where n represents an integer greater than 2 (hereinafter referred to as an extended time recording mode or simply as LP mode) is represented by $P_{T2}$. On the assumption, when the offset ΔH is selected to be $(\theta \cdot P_{T1})/180$ μm which in turn is determined by the track pitch $P_T$ in the SP mode, the offset ΔH will be excessively large for the LP mode, involving however no danger that newly recorded track might be erased. On the other hand, when the offset ΔH is selected to be $(\theta \cdot P_{T2})/180$ μm which is determined by the track pitch $P_{T2}$ in the LP mode, the offset ΔH is excessively small for the SP mode, resulting in undesirable erasure of the newly recorded track. Accordingly, it is necessary that the offset ΔH be determined on the basis of the track pitch $P_{T1}$ for the SP mode in accordance with the expression (1).

Figures 4A, 4B:
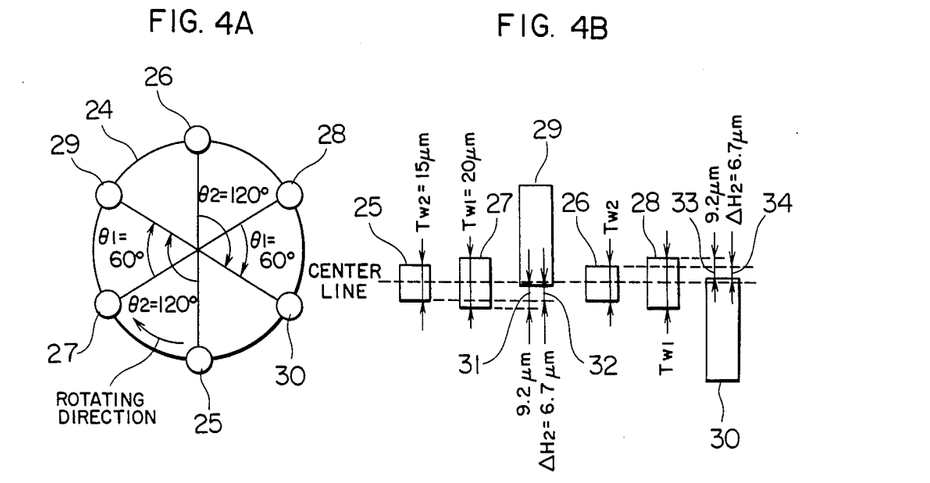

Next, a head mounting arrangement in a four-head type VTR will be described by referring to FIGS. 4A and 4B of which FIG. 4A shows a head disposition on the cylinder and FIG. 4B illustrates the inter-head offsets. In the figures, a reference numeral 24 denotes a cylinder, 25 and 26 denote video heads for the LP mode (hereinafter referred to as LP head), 27 and 28 denote video heads for the SP mode (hereinafter referred to as SP head), 29 denotes a flying erasing head destined only for the forward tape transporting operation mode, and a numeral 30 denotes a flying erasing head destined only for the backward tape transporting operation mode. Referring to FIG. 4A, it is assumed that angles $\theta_1$ and $\theta_2$ are 60° and 120°, respectively, the tracking width of the SP head is represented by Tw1, the tracking width of the LP head is Tw2, the track pitch in the LP mode is $P_{T1}$, and that the track pitch in the SP mode is represented by $P_{T2}$. When the offsets relative to the SP head and LP head are represented by $\Delta H_1$ and $\Delta H_2$, respectively, they can be given by the following expressions in accordance with the expression (1).

$$\Delta H_1 = \frac{P_{T1}}{3} = \frac{nP_{T2}}{3} \quad (2)$$

$$\Delta H_2 = \frac{2P_{T2}}{3} \quad (3)$$

In case of the four-head type VTR, from the viewpoint of performance, the tracking widths Tw1 and Tw2 are, respectively, restricted within the ranges defined as follows:

$$P_{T1} \leq Tw1 \leq 1.5 P_{T1} \quad (4)$$

$$P_{T2} \leq Tw2 \leq 1.5 P_{T2} \quad (5)$$

Furthermore, since the SP head 27 and the LP head 25 are mounted to be aligned with each other along the center line of the track, as in illustrated in FIG. 4B, the bottom face of the SP head 27 is lower than that of the LP head 25 by $(Tw1 - Tw2)/2$. It is now assumed that the offset of the flying erasing head 29 is set with reference to the bottom face of the LP head 25. On the assumption, the offset 31 of the bottom face of the flying erasing head 29 relative to that of the SP head 27 is given by $\Delta H_2 + (Tw1 - Tw2)/2$. On the other hand, the top face of the SP head 28 is higher than that of the LP head 26 by $(Tw1 - Tw2)/2$, whereby the offset 33 between the top face of the SP head 28 and that of the flying erasing head 30 is given by $\Delta H_2 + (Tw1 - Tw2)/2$.

As will be seen from the expressions (4) and (5), the offset becomes minimum when $Tw1 = P_{T1}$ and $Tw2 = 1.5 P_{T2}$. Since n is an integer greater than 2, $$\Delta H_2 + \frac{Tw1 - Tw2}{2} = \frac{2P_{T2}}{3} + \frac{nP_{T2} - 1.5P_{T2}}{2} = \frac{6n - 1}{12} P_{T2} > \Delta H_1 \quad (6)$$

Accordingly, the flying erasing head 29 (30) may be mounted with the offset 32 (34) of the value $\Delta H_2 = 2P_{T2}/3$ with reference to the LP head. In FIG. 4B, it is assumed that $Tw1 = 20 \mu m$, $Tw2 = 15 \mu m$, $P_{T1} = 20 \mu m$ and that $P_{T2} = 10 \mu m$. On the assumption, $\Delta H_2 = 6.7 \mu m$.

As will now be appreciated from the above description, in the case of the four-head VTR, erasing operation can be performed in both of the forward and backward tape transporting directions by disposing the LP heads, SP heads and the flying erasing heads with angular distance of 60° therebetween in the rotational direction of the cylinder and by mounting the flying erasing heads with the offset $\Delta H_2 = 2P_{T2}/3$ with reference to the LP head.

Figure 5A:
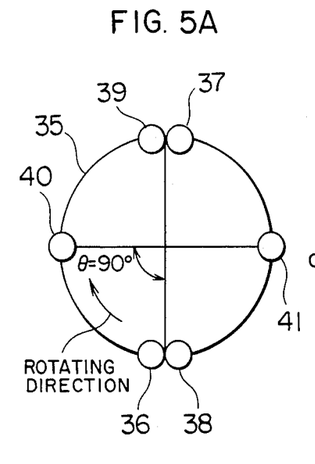

Next, a four-head type VTR in which double-azimuth head arrays are employed will be described by referring to FIGS. 5A, 5B, 6A and 6B. The phrase "double-azimuth head array" used herein means a combination or assembly of two heads having different azimuth angles and disposed close to each other with a distance corresponding to a value in a range of 0.5H to several H (where H represents a horizontal scan period). In FIG. 5A, a reference numeral 35 denotes a cylinder, numerals 36 and 37 denote SP heads having, respectively, plus (+) azimuth and minus (−) azimuth (hereinafter referred to as SP (+) head and SP (−) head, respectively), numerals 38 and 39 denote LP heads having, respectively, minus (−) azimuth and plus (+) azimuth (hereinafter referred to as LP (+) head and LP (−) head, respectively), a numeral 40 denotes a flying erasing head operative only in the forward tape transporting direction, and a numeral 41 denotes a flying erasing head operative only in the backward tape transporting direction. The heads 36 and 38 and the heads 37 and 39 constitute, respectively, the double-azimuth head array in which the gap distance is in the range of 0.5 H to several H, as defined above.

Figure 5B:
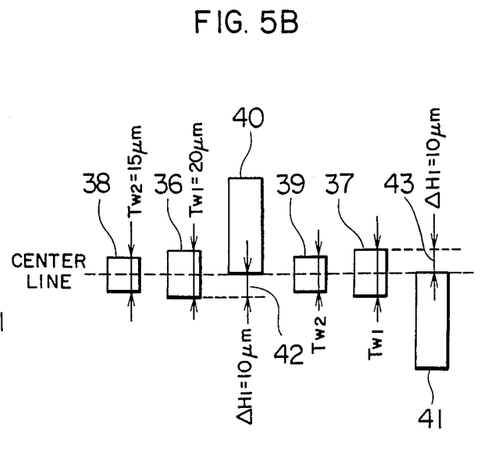

FIG. 5B is a view for illustrating the offsets among the various heads. It will be seen that the SP heads 36 and 37 and the LP heads 38 and 39 are, respectively, so mounted that the tracking centers thereof coincide with each other. It is assumed that the tracking widths of the SP heads 36, 37 and the LP heads 38, 39 are represented by Tw1 and Tw2, respectively, and that the track pitches are by $P_{T1}$ and $P_{T2}$. Further assuming that the flying erasing heads 40 and 41 are mounted with an angular distance $\theta$ relative to the video heads 36, 37, 38 and 39, it follows from the expression (1) that the flying erasing heads 40 and 41 may be mounted with an offset of $(\theta \cdot P_{T1})/180$ relative to the SP heads 36 and 37 and with an offset of $(\theta \cdot P_{T2})/180$ relative to the LP heads 38 and 39, wherein the following relation applies valid:

$$\frac{\theta \cdot P_{T1}}{180} > \frac{\theta \cdot P_{T2}}{180} \quad (7)$$

Since the tracking centers of the video heads 36, 37 and 38, 39 coincide with each other, the bottom face of the SP head (36, 37) is lower than that of the LP head (38, 39) by $(Tw1 - Tw2)/2$, while the top face of the SP head is higher than that of the LP head by $(Tw1 - Tw2)/2$. Assuming now that $\theta = 90°$, it follows from the expression (1) that the offsets $\Delta H_1$ and $\Delta H_2$ relative to the SP head and the LP head, respectively, are given by $$\Delta H_1 = \frac{P_{T1}}{2} = \frac{nP_{T2}}{2} \quad (8)$$

$$\Delta H_2 = \frac{P_{T2}}{2} \quad (9)$$

Since a characteristic feature of the four-head type VTR employing the double-azimuth heads resides in the still-field reproduction (i.e. still reproduction by the same azimuth head) in both SP and LP modes, it is required that $Tw1 \leq 2P_{T2}$ with a view to assure protection against interference from the next adjacent tracks in the LP mode. Further in consideration of the LP performance, it is preferred that $P_{T2} \leq Tw2 \leq 1.5P_{T2}$. Accordingly, the difference between the bottom faces of the SP head 36 and the LP head 38 and the difference between the top faces of the SP head 37 and the LP head 39 are, respectively, given by $(Tw1 - Tw2)/2 \leq (2P_{T2} - P_{T2})/2 = P_{T2}/2$. It is now assumed that the offset $\Delta H_1$ relative to the SP heads 36, 37 is imparted to the flying erasing heads 40, 41. On the assumption, it follows from the expression (8) that the offset $\Delta H_2'$ between the LP head (38, 39) and the flying erasing head (40, 41) is given by $$\Delta H_2' = \Delta H_1 - \frac{Tw1 - Tw2}{2} \geq \frac{nP_{T2}}{2} - \frac{P_{T2}}{2}$$

$$= \frac{1}{2}(n - 1)P_{T2}$$

Since n is an integer greater than 2 (two), $$H_2' \geq \Delta H_2 = \frac{P_{T2}}{2} \quad (9)$$

This means that the newly recorded track is not erased by the flying erasing heads 40, 41 in the LP mode.

As will be apparent from the above analyses, in the four-head type VTR employing the double-azimuth heads, erasure in both SP and LP modes is rendered possible in either the forward or backward tape transporting direction by mounting the flying erasing heads 40 and 41 with an angle $\theta$ of 90°, as shown in FIG. 5A and by determining the offsets in accordance with $\Delta H_1 = P_{T1}/2$ with reference to the SP heads 36 and 37, as illustrated in FIG. 5B. By way of example, when $Tw1 = 20 \mu m$, $Tw2 = 15 \mu m$, $P_{T1} = 20 \mu m$ and $P_{T2} = 10 \mu m$, then $\Delta H_1 = 10 \mu m$, as is illustrated in FIG. 5B.

Figures 6A, 6B:
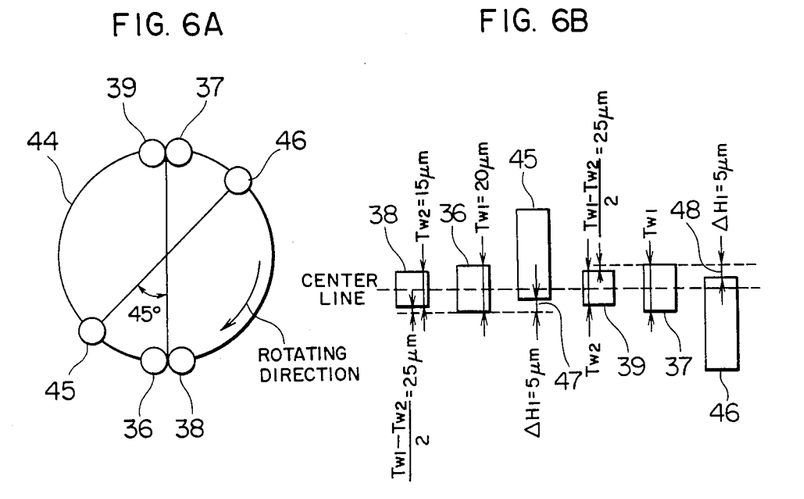

FIGS. 6A and 6B show a specific version of the arrangement shown in FIGS. 5A and 5B. As is with the case of the latter, Tw1=20 μm, Tw2=15 μm, $P_{T2}$=10 82 m. However, in the case of the head arrangement shown in FIGS. 6A and 6B, the angle θ is selected to be 45°. Accordingly, $\Delta H_1$=5 μm, $\Delta H_2$=2.5 μm and (Tw1−Tw2)/2=2.5 μm. Thus, by selecting $\Delta H_1$=5 μm as the offsets 47 and 48 as shown in FIG. 6B, $$\Delta H_2' \left( = \Delta H_2 + \frac{Tw1 - Tw2}{2} \right)$$

is equal to $\Delta H_1$, which means that the record track can be completely erased in both the SP mode and the LP mode.

Next, description will be made on the erasing circuit according to an exemplary embodiment of the invention by referring to FIGS. 7 and 8. As described above with reference to FIGS. 3A to 6B, since the different flying erasing heads are employed in the forward and backward tape transporting directions, respectively, with the offset being varied, simultaneous current supply to both the flying erasing heads results in erasure of the newly recorded track. Accordingly, it is necessary to change over the erasing current between the forward tape transporting mode and the backward tape transporting mode.

Figure 7:
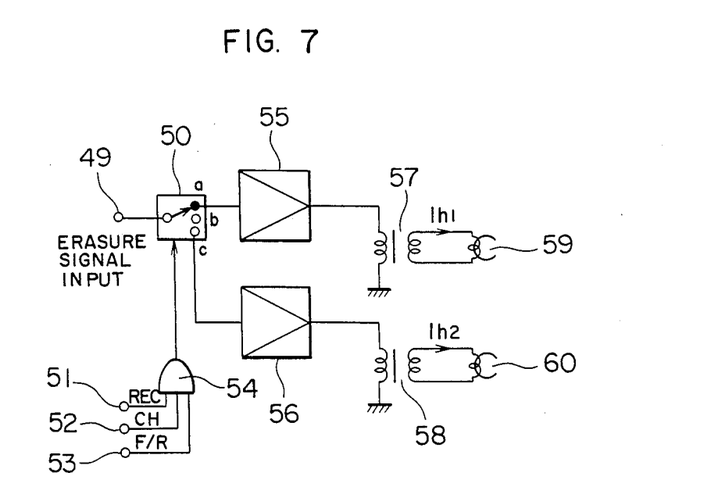
FIGS. 7 and 8 are circuit diagrams of erasing circuits, respectively.
Figure 8:
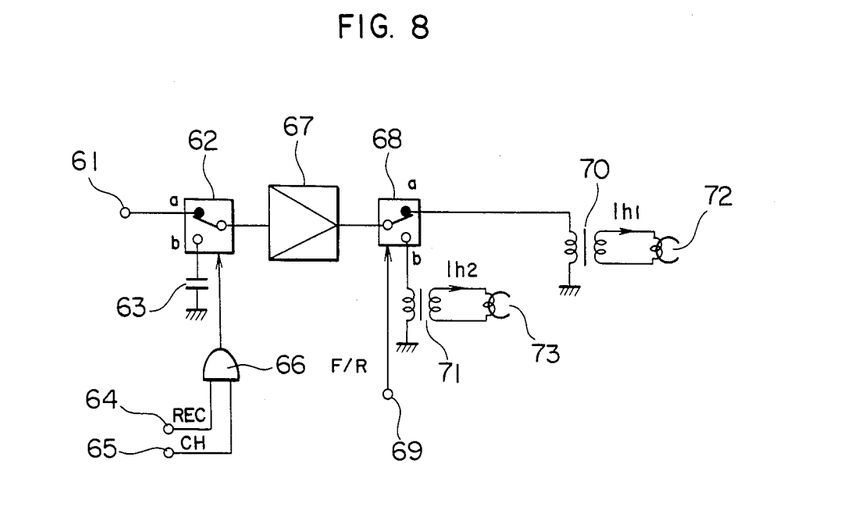

FIG. 7 shows an erasing circuit in which two erasing amplifiers 55 and 56 are employed, while FIG. 8 shows an erasing circuit in which a single erasing amplifier 57 is employed. First referring to FIG. 7, a reference numeral 55 denotes an erasing amplifier only for the forward tape transporting mode, 57 denotes a rotary transformer, 59 denotes a flying erasing head, 56 denotes an erasing amplifier only for the backward tape transporting mode, and a numeral 60 denotes another flying erasing head. The change-over of the erasing current is effected by a switch 50 in dependence on the logical output of an AND gate 54 having the inputs supplied with a recording/reproduction indentifying signal REC, a channel change-over signal CH representative of the change-over of channel and a forward/backward tape transporting mode indentifying signal F/R, respectively.

Figure 9:
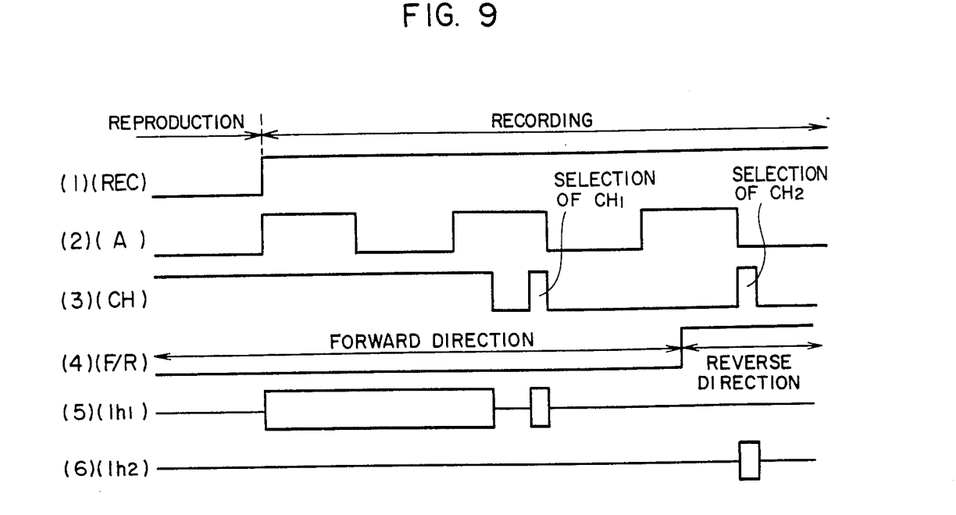
FIG. 9 shows a timing chart for illustrating operation of the erasing circuit.

FIG. 9 shows a timing diagram. Upon reproduction, the recording/reproduction indentifying signal REC assumes a low level, whereby the switch 50 is closed to a contact b. Upon recording, the recording/reproduction identifying signal REC assumes a high level. When the channel change-over signal CH is then at high level, indicating a video signal recording period, a current $Ih_1$ flows constantly to the head 59 operative in the forward tape transportation. At that time, the switch 50 is closed to a contact a. A signal A represents a head change-over signal of 30 Hz derived from a pulse signal which is supplied from a tachogenerator coupled operatively to the rotating cylinder and carrying phase information. By way of example, when the recording is to be made for the first channel CH 1 in the forward tape transporting mode, the channel change-over signal CH assumes a high level at the position corresponding to the first channel CH 1, as previously described by referring to FIG. 1, resutling in that the head 59 operative in the forward tape transporting mode is supplied with the current $Ih_1$. When the recording is to be made for the second channel CH 2 in the backward tape transporting mode, the backward/forward identifying signal F/R assumes a high level, while the channel change-over signal CH becomes high at the position corresponding to the second channel CH 2, resulting in that a current $Ih_2$ flows to the head 60 operative only in the backward tape transporting mode. At that time point, the switch 50 is closed to a contact c.

Referring to FIG. 8, the change-over between the erasing currents $Ih_1$ and $Ih_2$ for the forward and backward transportation modes is effected by a switch 68 or the output side of the erasing amplifier 67. The turning-on/off of the erasing signal is effected by a switch 62 connected to precedence to the erasing amplifier 67. In the reproduction mode, the switch 62 is closed to a contact b, whereby the erasing signal is blocked.

Figure 10:
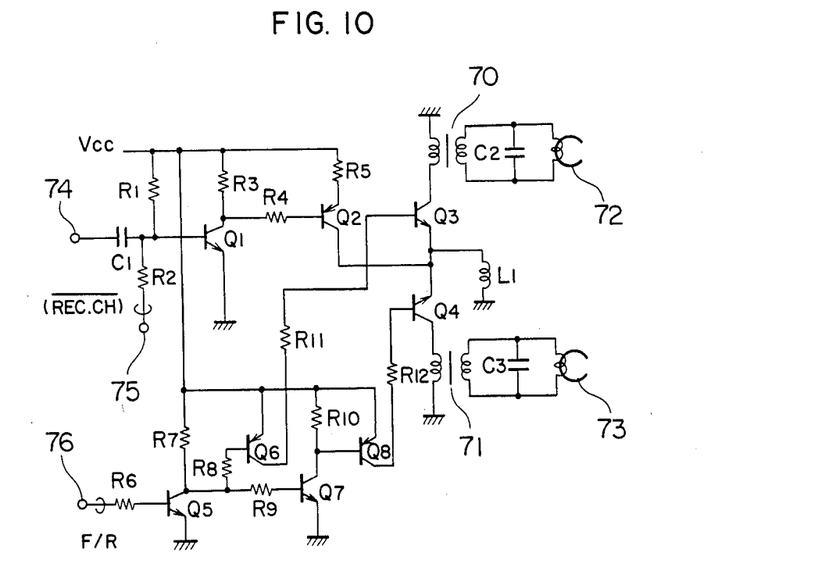
FIG. 10 is a circuit diagram showing an example of the erasing circuit in a more concrete configuration.

FIG. 10 shows in concrete an exemplary arrangement of the erasing current change-over circuit shown in FIG. 8. In FIG. 10, a reference numeral 74 denotes an erasing signal input terminal, and 75 denotes an input terminal for signal REC·CH representative of an inverted sum signal of the REC and CH signals. When the signal REC·CH is low, a transistor $Q_1$ is biased to allow the erasing signal applied to the input terminal 74 to be amplified through the transistors $Q_1$ and $Q_2$, wherein the output signal (erasing signal) of the transistor $Q_2$ is supplied to emitters of transistors $Q_3$ and $Q_4$, respectively. When the signal F/R applied to a terminal 76 is high, the transistor $Q_3$ is turned on, allowing the erasing signal to flow to the head 72 operative in the forward tape transporting mode. On the other hand, when the signal F/R is at a low level, the transistor $Q_4$ is turned on, resulting in that the erasing signal is supplied to the head 73 operative in the backward tape transporting mode.

An inductance L1 serves to turning on the transistor $Q_3$ or $Q_4$. This inductance is required to be set at a sufficiently large value when compared with the inductance of the head 72 or 73. Capacitors $C_2$ and $C_3$ cooperate with the heads 72 and 73 to constitute resonance circuits, respectively, which are effective for reducing the effective power supplied to the stator sides of the rotary transformers 70 and 71, respectively.

As will be appreciated from the foregoing description, in the magnetic recording/reproducing apparatus adapted for recording/reproducing the PCM audio signal, the complete erasure of the record track can be accomplished upon recording on the magnetic tape transported in either the forward or backward direction. Furthermore, the erasing system of the two-head type magnetic recording/reproduction apparatus as well as the four-head type magnetic recording/reproduction apparatus having both SP and LP modes can be realized with a minimum number of the flying erasing heads.

What is claimed is:

1. A magnetic recording/reproducing apparatus in which each of slant record tracks on a magnetic tape is divided into a plurality of channels in a longitudinal direction of a respective slant track so that different audio signals having undergone a pulse code modulation are recorded or reproduced on or from the respective associated channels, comprising:

a rotatable cylinder;
at least two magnetic heads mounted on said rotatable cylinder with a distance of 180° therebetween for recording or reproducing said audio signals on or from said record tracks, said at least two magnetic heads being mounted on said rotatable cylinder so that gap centers thereof are aligned with each other;

said magnetic tape being wrapped around said rotatable cylinder and capable of being transported selectively in either a forward direction or a backward direction;

a first erasing head mounted on said rotatable cylinder with a first predetermined offset with respect to one of said at least two magnetic heads, said first erasing head being operative when said magnetic tape is transported in the forward direction;

a second erasing head mounted on said rotatable cylinder with a second predetermined offset with respect to the other of said at least two magnetic heads, said second erasing head being operative when said magnetic tape is transported in the backward direction; and an erasing circuit supplied with a forward/backward identifying signal for discriminatively identifying whether a direction of transportation of said magnetic tape is in the forward or backward direction, a recording/reproduction identifying signal for discriminatively identifying whether recording or reproduction is effected, and a channel change-over signal, said erasing circuit selecting one of said first and second erasing heads in accordance with said forward/backward identifying signal upon erasure when said recording/reproduction signal identifies recording and supplying an erasure signal to said selected erasing head at any desired one of said plurality of channels in accordance with said channel change-over signal.

2. A magnetic recording/reproducing apparatus according to claim 1, wherein each of said first and second erasing heads has a tracking width which is at least twice as large as a track pitch so as to enable simultaneous erasure of two adjacent record tracks.

3. A magnetic recording/reproducing apparatus according to claim 2, wherein a bottom face of said first erasing head is mounted with said first predetermined offset with respect to a bottom face of said one magnetic head which determines the position of a boundary between the adjacent record tracks when said magnetic tape is transported in the forward direction, and a top face of said second erasing head is mounted with said second predetermined offset with respect to a top face of said other magnetic head which determines the position of a boundary between the adjacent record tracks when said magnetic tape is transported in the backward direction.

4. A magnetic recording/reproducing apparatus according to claim 3, wherein said fisrt and second erasing heads are mounted on said rotatable cylinder with a displacement angle $\theta$ relative to said one and other magnetic heads, and each of said first and second predetermined offsets is selected to be equal to $(\theta \cdot P_T)/180$, $P_T$ being said track pitch.

* * * * *